United States Patent [19]
Carr

[11] 3,719,385
[45] March 6, 1973

[54] CHASSIS-TO-CONTAINER LOCKING MEANS

[75] Inventor: George W. Carr, Cincinnati, Ohio
[73] Assignee: Pullman Incorporated, Chicago, Ill.
[22] Filed: Dec. 15, 1970
[21] Appl. No.: 98,344

[52] U.S. Cl..........296/35 A, 24/230 AN, 105/366 C, 248/361 R
[51] Int. Cl. ..............................................B60p 7/10
[58] Field of Search ....296/35 A; 280/DIG. 8, 179 R; 105/366 R, 366 B, 366 C, 366 D; 248/119 R, 361 R; 24/230 AL, 230 AN; 292/58, 60, 61, 62, DIG. 49

[56] References Cited

UNITED STATES PATENTS

| | | | |
|---|---|---|---|
| 3,220,359 | 11/1965 | Banerjea | 105/366 R |
| 2,693,153 | 11/1954 | Storch | 105/366 C X |
| 3,586,286 | 6/1971 | Pratt | 248/361 R |
| 3,144,838 | 8/1964 | Shaver et al. | 105/366 C |
| 3,317,236 | 5/1967 | Connerat et al. | 296/35 A |
| 3,614,153 | 10/1971 | Tantlinger et al. | 296/35 A |
| 901,470 | 10/1908 | Rankins | 292/61 |
| 1,052,785 | 2/1913 | Allison | 292/58 |
| 3,594,876 | 7/1971 | Gunther | 24/221 R |

*Primary Examiner*—Leo Friaglia
*Assistant Examiner*—Leslie J. Paperner
*Attorney*—Hilmond O. Vogel and Richard J. Myers

[57] ABSTRACT

A locking mechanism for coupling of the trailer chassis to the supported container where the locking mechanism is an end extension of the chassis cross member having an intermediate transverse wall and a back wall adjacent the container corner casting, a rearward horizontally extending rotatable locking pin reciprocally disposed in both walls from a withdrawn unlocked position with the rearward end of the pin inwardly of the back wall to an extended locked position with the rear end of the pin being outwardly of the back wall and into the end opening in the container corner casting, handle means for rotating and longitudinally moving the pin between both positions with the handle riding and a vertical slot and a diagonal extending horizontal guide slot and spring means connecting with a moment arm on the front side of the pin for biasingly holding the pin in either position.

7 Claims, 7 Drawing Figures

PATENTED MAR 6 1973 3,719,385

*INVENTOR.*
GEORGE W. CARR
BY Richard J. Myers
ATTORNEY

INVENTOR.
GEORGE W. CARR
BY Richard J. Myers
ATTORNEY

CHASSIS-TO-CONTAINER LOCKING MEANS

BACKGROUND OF THE INVENTION

1. Field of Invention.

The field of art to which this invention pertains is the highway trailer art and in particular relates to means for coupling the trailer chassis to a removable container carried thereon.

2. Description of the Prior Art.

It is well-known in the prior art to provide for various types of coupling means for attaching of the trailer chassis to a removable container stored thereon. However, it is important to provide for a chassis-to-container coupling and locking arrangement which provides for horizontal locking means which is easy to be reached by the operator for placing the locking means in unlocked and locked positions.

SUMMARY

This invention relates to chassis-to-container locking mechanism and in particular to locking means for coupling demountable containers to chassis of highway trailers.

It is a general object of this invention to provide for locking means mounted on the trailer chassis cross member extensions which move horizontally into the corner casting openings of the container wherein there is provided handle means which rotate and move the locking pin horizontally between extended locked and retracted unlocked positions.

Another object of this invention is to provide for chassis-to-container locking means which includes a locking pin guided by handle means engageable with a cam slotted portion of the cross member for longitudinal reciprocal movement of the locking means and wherein there is provided biasing means for holding the handle in an over-center relation of the handle moment arm to fix the axis of rotation of the pin in locked and unlocked positions thereof.

A further object of the invention is to provide a lock arrangement wherein the locking handle is prevented from hitting the trailer chassis wheel on turning of the vehicle.

These and other objects will become apparent from reference to the following description, attached drawings and appended claims.

DESCRIPTION OF THE PREFERRED EMBODIMENTS

Figure 1:
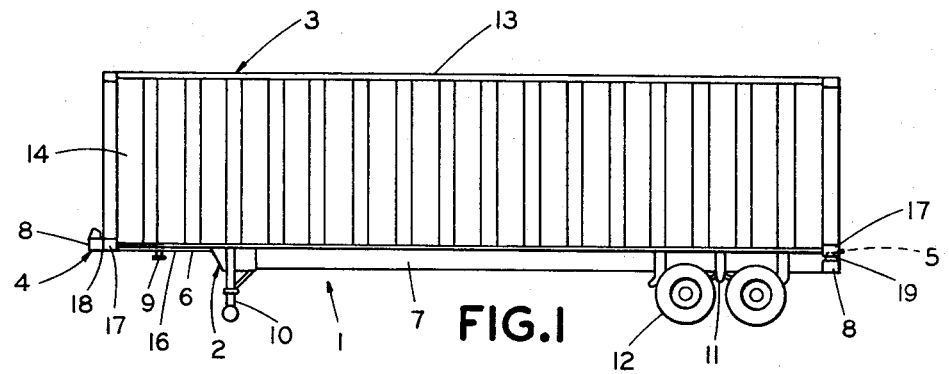
FIG. 1 is a general side elevation view of the chassis and removable container including the forward and rearward container locks.
Figure 2:
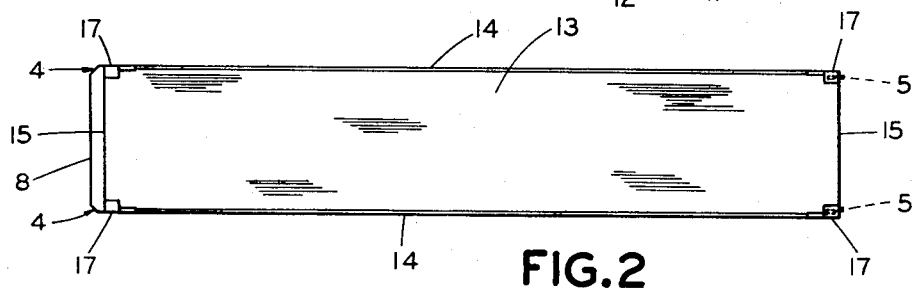
FIG. 2 is a plan view of the coupling of the container and chassis.

With reference to the drawings and in particular with reference to FIGS. 1 and 2, there is shown a trailer 1 including a chassis 2 supporting a removable container 3 thereon. The container is coupled to the chassis by a front pair of chassis-to-container locking means 4 and a rear pair of chassis-to-container hold-down locking means 5. The locking means 4 provide for horizontally extendable coupling with the container and the locking means 5 provide for vertically extending coupling with the container. The chassis incorporates a main frame 6 including longitudinal members 7 and end cross members 8. The kingpin 9 depends from the forward end of the chassis, and rearwardly thereof the landing gear 10 and then the suspension system 11 and wheel 12 are located. The container 3 is provided with a top 13, sides 14, end walls 15, a bottom 16 and bottom corner castings 17 each having an end opening 18 and a bottom opening 19.

Figure 3:
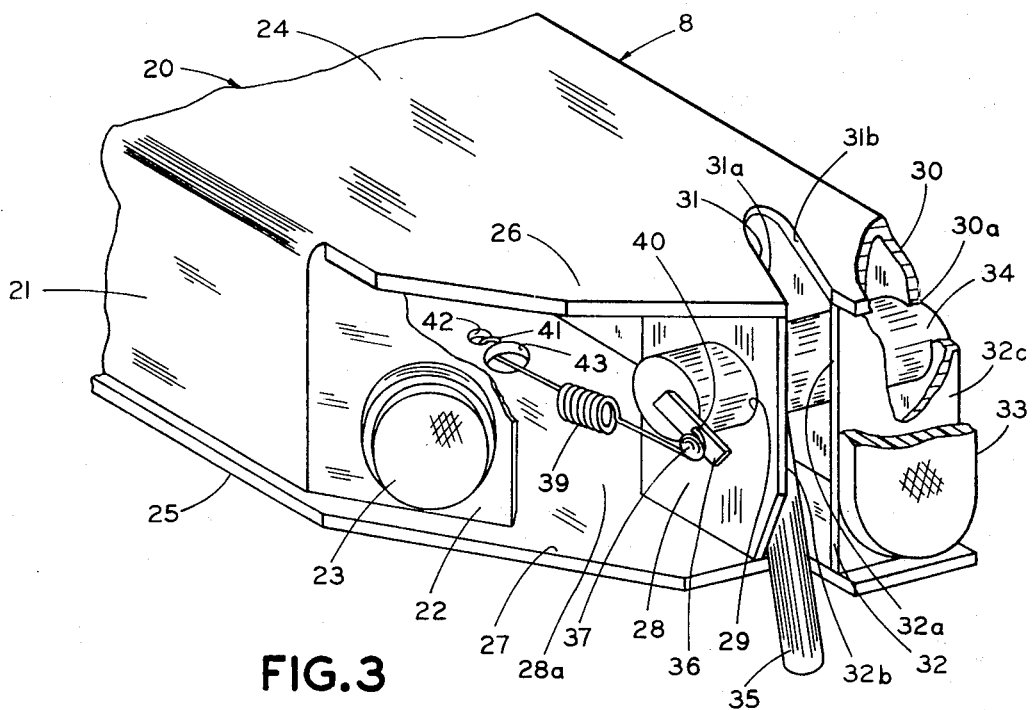
FIG. 3 is a perspective view of the container chassis lock arrangement in the unlocked position at the end of the trailer chassis cross member.
Figure 4:
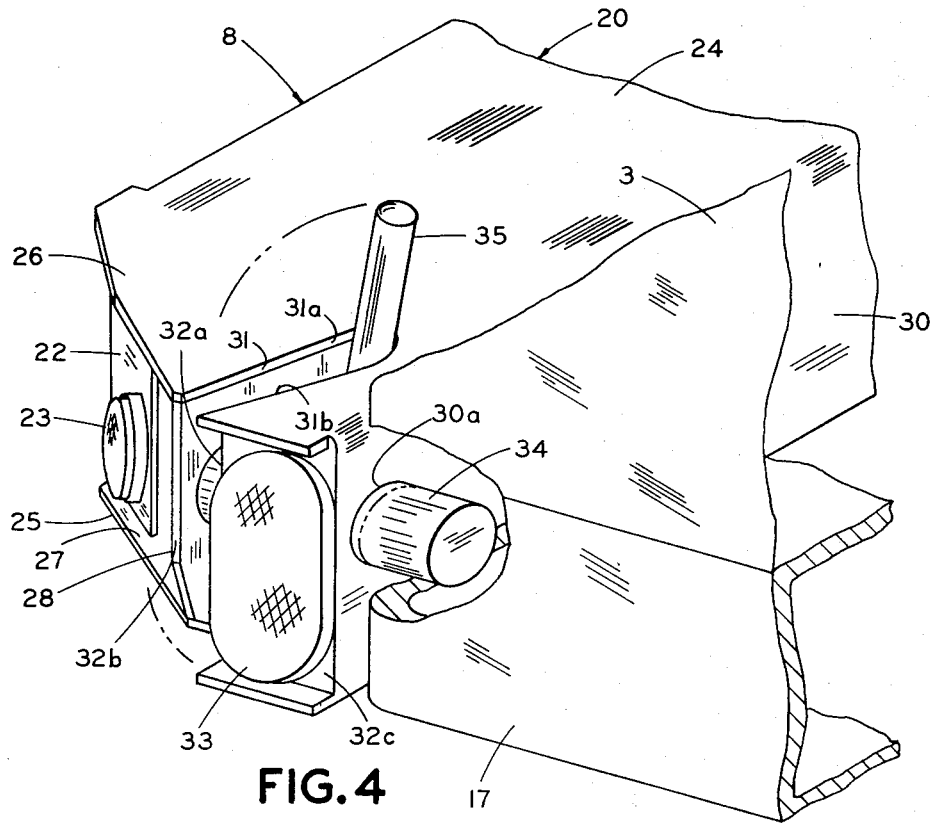
FIG. 4 is a further perspective view of the container chassis lock arrangement in the locked position.

Attention is now to be directed to the perspective views shown in FIGS. 3 and 4 where it is seen that the locking means 4 include the front cross member which is provided with lateral end extension portions 20 on each side. Each extension portion is provided with a front wall 21 and a sloped or inclined forward side wall 22 for side marker light 23. The extension 20 has a top plate 24 and a bottom plate 25. The plate 24 has a top overhanging flange portion 26 that is angulated and bottom plate 25 has a bottom overlapping flange portion 27 that is angulated. The extension portion 20 is provided with an intermediate end transverse support wall 28 which has a journaled opening 29. The extension is further provided with a back wall 30 with a pin receiving opening 30a. The top wall or plate 24 is provided with a slot edge portion 31 defining a slot and having edges 31a and 31b. The side wall 32c carrying the side reflector 33 is provided with a slotted edge portion 32 defining a vertical slot having edges 32a and 32b. A locking pin or structure 34 is reciprocally supported in journals 29 and 30a for longitudinal movement in and out of the opening in the corner casting of the container at the forward end portions of the trailer chassis. The handle 35 is fixedly attached to the locking pin 34 which is provided with a moment arm 36 spaced between walls 22 and 28 defining an end opening 28a in the extension 20. A spring retainer 37 mounted on the moment arm and a spring end 40 of the spring 39 is attached to the spring retainer 37 and the other spring end 41 of the spring is attached through a pair of openings 42 and 43 in the bottom plate 25 of the extension, the larger opening 43 permitting withdrawal of the spring from the extension.

By this arrangement the handle 35 of the locking pin 34 may be swung from the unlocked or lowered position of the handle (see Feb. 3) upwardly along vertical guiding edges 32a and 32b, the edge 32a being slightly inclined upwardly until the handle reaches an interim position at the juncture of the inside of the extension with the top plate of the extension. If, at this point, the locking pin is permitted to enter an aligned opening in the corner casting, the spring 39 pulls the moment arm 36 to force the pin horizontally into the corner casting because of the over-center relationship of the moment arm 36 whence the arm 36 will move to the extreme raised position being guided in the top plate diagonally extending slot defined by the top edges 31a and 31b of the slotted portion 31 causing not only rotational movement of the pin as before but outward movement of the pin into the corner casting. To withdraw the locking pin from the hole in the corner casting, the handle must be rotated to the unlocked position. The overcenter arrangement of the locking pin in raised and lowering positions provides a positive lock. The intermediate position keeps the locking pin under the force of the spring which will move the handle into locking position (see Feb. 4) after the container is shaken by a crane in order to align the holes in the casting with the locking pins. At the time of loading of the container, the handle of the locking pin is in the unlocked position and tucked inwardly of the extension where it cannot be damaged by a container hanging from the crane. At the time of moving of the chassis on the road without a container, if the handle is left in the unlocked position it cannot be damaged because it is within the turning radius of the vehicle.

Figure 5:
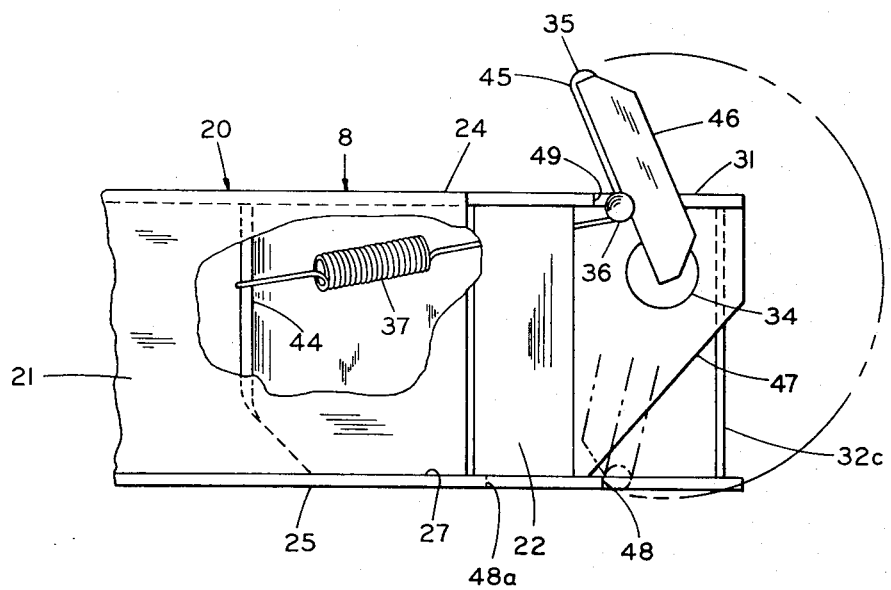
FIG. 5 is a side elevational view of a modified form of the chassis-to-container lock arrangement.
Figure 6:
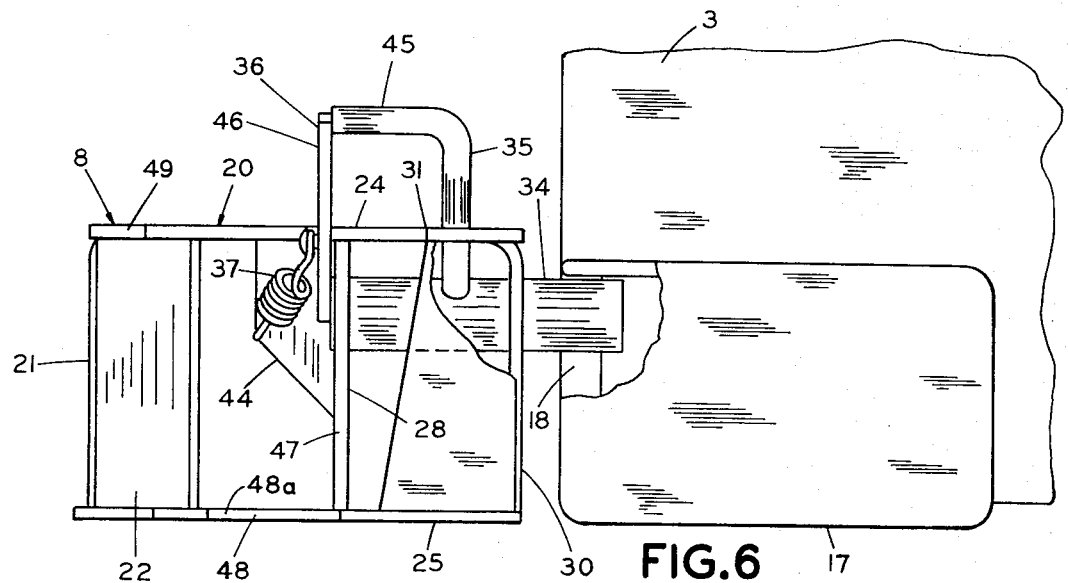
FIG. 6 is an end elevational view of the arrangement shown in FIG. 5.
Figure 7:
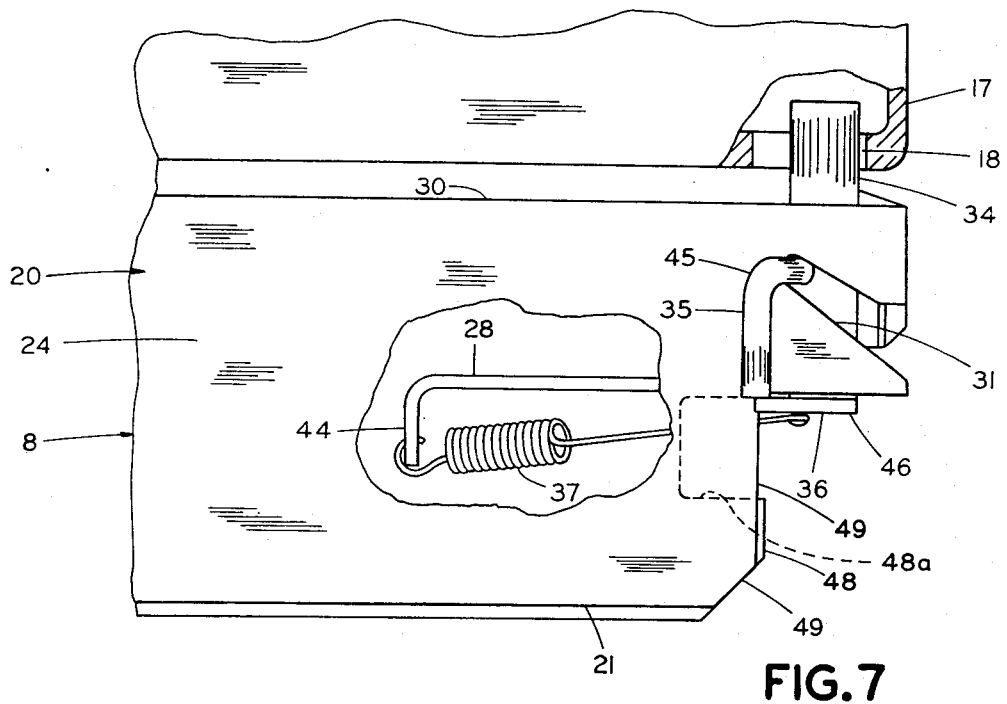
FIG. 7 is a plan view of the arrangement shown in FIGS. 5 and 6.

A modified form of the invention is shown in FIGS. 5–7. It is seen that the spring 39 is attached to the upright interior end wall 44 of the extension 20 rather than to the bottom plate and the handle is provided with an upper horizontal portion 45 in the modification that is affixed to an extension 46 of the moment arm 36 to provide for an easy gripping action in pulling the locking handle between locked and unlocked positions. Further, in this modification the intermediate wall 28 has been cut at its bottom portion to define a sloped edge 47 and the bottom plate is cut short to provide an edge 48 (which has a slot 48a to permit operator to grab handle 45 to raise it) and the top plate has been cut short to provide an edge 49 whereby the handle may be swung from an upper locked position (shown in solid line in FIG. 5) within the end of the extension 20 to a downwardly tucked unlocked position (shown in dotted line in FIG. 5) within the end of the extension, as best seen in FIG. 5.

The foregoing description and drawings merely explain and illustrate the invention and the invention is not limited thereto, except insofar as the appended claims are so limited, as those skilled in the art who have the disclosure before them will be able to make modifications and variations therein without departing from the scope of the invention.

What is claimed is:

1. A coupler device for attaching a container corner casting to the chassis of a highway trailer comprising:
   a container locking housing,
   a pair of upright walls being apertured for journaling a locking pin therein,
   a locking pin supported by said pair of walls for reciprocal movement between container locked and container unlocked positions,
   cam slot means provided on the housing for receiving handle means therethrough,
   handle means connecting with said pin and engaging the edges of the slot means for reciprocal movement and rotational movement of the locking pin between the locked and unlocked positions,
   said slot means including a vertical slot in the end of the housing and a diagonal slot in the top of the housing connecting with the vertical slot providing for horizontal reciprocal and rotational movement of the pin, and
   biasing means on said housing connecting with said locking pin and urging said handle means upwardly into and against the diagonal slot or downwardly in the vertical slot against the lower part of the housing.

2. A chassis-to-container locking arrangement comprising:
   a lock housing,
   a locking pin supported for horizontal reciprocal and rotational movement within the housing,
   said housing having slot means being defined by an upper horizontal slot above the pin and a lower vertical slot outwardly of the pin and connecting with the horizontal slot,
   said horizontal slot extending transversely of said vertical slot,
   handle means extending through said slot means and connecting with said pin,
   said slot means having camming surfaces in both the horizontal and vertical slots for providing rotational and longitudinal reciprocal movement of the pin between locked and unlocked positions of the handle means,
   moment arm means at one end of the pin within the housing, the other end of the pin being extendable within the housing in the unlocked position and without the housing in the locked position for engagement with the aperture in the corner of the container, and
   spring means connecting the moment arm means with the housing with the spring means being in an over-center relation with respect to the axis of the pin in both locked and unlocked positions thereof with the handle means being held against movement with the upper slot and with the lower slot alternately.

3. A coupler device for attaching a container corner casting to the chassis of a highway trailer comprising:
   a container locking housing,
   a pair of upright walls being apertured for journaling a locking pin therein,
   a locking pin supported by said pair of walls for reciprocal movement between container locked and container unlocked positions,
   cam slot means provided on the housing for receiving handle means therethrough,
   handle means connecting with said pin and engaging the edges of the slot means for reciprocal movement and rotational movement of the locking pin between the locked and unlocked positions, and
   a moment arm mounted on the locking pin within said housing and spring means connecting the moment arm with the housing and urging said locking pin into locked and unlocked over-center condition in both the locked and unlocked positions of the pin.

4. The invention according to claim 3, and
   said handle means having an extension connecting with said moment arm.

5. The invention according to claim 3, and
   said slot means including a vertical slot in the end of the housing and a diagonal slot in the top of the housing connecting with the vertical slot providing for horizontal reciprocal and rotational movement of the pin.

6. The invention according to claim 5, and
a chassis cross member having an end extension defining said housing.

7. The invention according to claim 5, and said slot means further including a horizontal slot in the bottom of the housing whereby in the unlocked position the handle means is held down out of the way of a container in the horizontal slot by the biasing means.

* * * * *